United States Patent [19]
Chen et al.

[11] Patent Number: 5,851,688
[45] Date of Patent: Dec. 22, 1998

[54] THIN FILM MAGNETIC ALLOY HAVING LOW NOISE, HIGH COERCIVITY, AND HIGH SQUARENESS

[75] Inventors: Tu Chen, Monte Sereno; Tsutomu Tom Yamashita, Milpitas; John Ko-Jen Chen, Monte Sereno; Rajiv Yadav Ranjan, San Jose; Keith Kadokura, Cupertino; Ting Joseph Yuen, Fremont, all of Calif.

[73] Assignee: Komag, Inc.

[21] Appl. No.: 974,929

[22] Filed: Nov. 20, 1997

Related U.S. Application Data

[63] Continuation of Ser. No. 189,088, Jan. 28, 1994, abandoned.

[51] Int. Cl.[6] ........................................................ G11B 5/66
[52] U.S. Cl. .............................. 428/694 T; 428/694 TS; 428/692; 428/693; 428/698; 428/704; 428/900; 204/192.2; 427/128; 427/131
[58] Field of Search .......................... 428/694 T, 694 TS, 428/692, 693, 698, 704, 900; 204/192.2; 427/128, 131

[56] References Cited

U.S. PATENT DOCUMENTS

| | | | |
|---|---|---|---|
| 4,554,217 | 11/1985 | Grimm et al. | 428/469 |
| 4,749,459 | 6/1988 | Yamashita et al. | 204/192.15 |
| 4,786,564 | 11/1988 | Chen | 428/694 TS |
| 4,837,094 | 6/1989 | Kudo | 428/694 T |
| 4,988,578 | 1/1991 | Yamashita et al. | 428/678 |
| 5,066,552 | 11/1991 | Howard | 428/694 T |
| 5,466,522 | 11/1995 | Freeman | 428/332 |

FOREIGN PATENT DOCUMENTS 5978518  5/1984  Japan .

OTHER PUBLICATIONS

Maeda, "High coerativity co and co–mi alloy alves" J. Appl. Phys., vol. 53, No. 5, May 1982.
Williams and Comstrock, "An Analytical Model of the Write Process in Digital Magnetic Recording", 17th annual AIP Conf. Proc., Part I, No. 5, 1971, pp. 738–742.
Zhu et al., "Micromagnetic Studies of Thin Metallic Films", Journal of Applied Physics, vol. 63, No. 8, 1988, p. 3248.
Chen et al., "Physical Origin of Limits in the Performance of Thin–Film Longitudinal Recording Media", IEEE Trans. Mag., vol. 24, No. 6, 1988, p. 2700.
Murdock et. al., "Roadmap to 10 $Gb/in^2$ Media: Challenges", IEEE Trans. Mag., 1992, p. 3078.
Opfer et. al., "Thin Film Memory Disk Development", Hewlett Packard Journal, Nov., 1985, pp. 4–10.
Aboaf et. al., "Magnetic Properties and Structure of Co–Pt Thin Film", IEEE Trans. Mag., MAG–19, No. 4, 1983, p. 1514.
Maeda, H., "Effects of Nitrogen on the High Coercivity and Microstructures of Co–Ni Alloy Films", Journal of Applied Physics, vol. 53, No. 10, 1982, pp. 6941–6945.
H.P. Application Note #358–3, "Time Domain Characterization of Disk Drivers".

(List continued on next page.)

*Primary Examiner*—Leszek Kiliman
*Attorney, Agent, or Firm*—Jonathan A. Small

[57] ABSTRACT

A Co—Pt based magnetic alloy which has been doped with a relatively high amount of nitrogen, e.g., at or above 1 at. % is obtained having high coercivity, for example in the range of 1400 Oe or above, and an increased signal-to-noise ratio as compared to the same Co—Pt based alloy which has not been doped with nitrogen. The alloy is vacuum deposited, for example, by sputtering, and the nitrogen may be introduced from the sputtering gas or from the sputtering target. Other low-solubility elements providing the grain uniformity and isolation include: B, P, S, C, Si, As, Se and Te.

19 Claims, 4 Drawing Sheets

OTHER PUBLICATIONS

Binary Alloy Phase Diagrams, Volts I and II, Ed. T. B. Massalski, American Society of Metals (Ohio, 1986).

Heitmann et. al., "Infuence of Nitrogen, Oxygen, and Water on Magnetic Properties of de Magnetron Sputtered GdTbFe Films", Journal of Applied Physics, vol. 61, No. 8, 1987, pp. 3343–3345.

Maeda, H., "High Coercivity Co and Co–Ni Alloy Films", Journal of Applied Physics, vol. 53, No. 5, May 1982, pp. 3735–3739.

Potzberger, "Megnetron Sputtering of Permalloy for Thin–Film Heads", IEEE Transaction on Magnetics, MAG 20, No. 5 Sep. 1984, pp. 851–853.

THIN FILM MAGNETIC ALLOY HAVING LOW NOISE, HIGH COERCIVITY, AND HIGH SQUARENESS

This application is a continuation of application Ser. No. 08/189,088, filed Jan. 28, 1994, now abandoned.

FIELD OF THE INVENTION

The present invention relates generally to the field of magnetic recording media of the type used in rigid disk drives for computer data storage, and more particularly to magnetic alloys used in such magnetic recording media which include, inter alia, a relatively large percentage of nitrogen to provide high coercivity and saturation magnetization, and low noise and PW50.

BACKGROUND

Recording performance for magnetic disks are determined by three basic characteristics—narrow PW50, high overwrite, and low noise. PW50 is the pulse width of the bits expressed in either time or distance, defined as the width of the pulse at half-maximum. Having a narrower (and more well-defined) pulse allows for higher recording density. A wide PW50 means that the bits are crowded together, causing them to interfere with each other. This interference is termed inter-symbol interference. Excessive inter-symbol interference limits the packing density of bits in a given area.

Conventionally, there are number of media factors which affect PW50. In order to achieve narrow PW50, the coercivity ("Hc") of the media must be high. However, if Hc is too high, the head field will have a difficult time saturating the media, resulting in poor overwrite. Overwrite ("OW") is a measure of the ability of the media to accommodate overwriting existing data. That is, OW is a measure of what remains of a first signal after a second signal (for example of a different frequency) has been written over it on the media. OW is poor when a significant amount of the first signal remains. OW is generally affected by Hc, thickness, and the hysteresis loop squareness of the film.

PW50 may be reduced by using a thinner magnetic film. Another means of reducing PW50 is to increase hysteresis loop squareness, and narrow the switching field distribution, as described by William and Comstock in "An Analytical Model of the Write Process in Digital Magnetic Recording," A.I.P. Conf. Proc. Mag. Materials, 5, p. 738 (1971). Hysteresis loop squareness ("S") has several components, including coercivity squareness ("S*") and remanant coercivity squareness ("S*rem").

Noise performance of a magnetic film can be defined in terms of read jitter and write jitter. In peak-detection type recording channels, Noise, together with inter-symbol interference, contributes to the uncertainty in the location of the individual bits, which cause the data to be read with some displacement in timing from that which is expected. This displacement is referred to as bit shift. The bit shift needs to be reduced to a minimum for a given timing window of the bit in order to assure accuracy in reading the bit.

Read jitter is primarily determined by the amount of signal available from the bit, and the electronic noise in the channel. A thicker magnetic film will typically provide reduced read jitter. Unlike read jitter, write jitter is determined by the intrinsic noise of the film. Intrinsic media noise has been theoretically modeled by Zhu et al. in "Micromagnetic Studies of Thin Metallic Films", J. Appl. Phys., vol. 63, no. 8, p. 3248 (1988), which is incorporated by reference herein. Chen et al. describe the source of intrinsic media noise in "Physical Origin of Limits in the Performance of Thin-Film Longitudinal Recording Media," IEEE Trans. Mag., vol. 24, no. 6, p. 2700 (1988), which is also incorporated by reference herein. The primary source of intrinsic noise in thin film media is from the interparticle exchange interaction. In general, the higher the exchange interaction, the greater the noise.

The noise from interparticle exchange interaction can be reduced by isolating the individual particles. This may be accomplished by spacing the grains apart from one another, or by interposing a non-magnetic material or insulator at the grain boundaries as described by Chen et al. in the aforementioned "Physical Origin of Limits in the Performance of Thin-Film Longitudinal Recording Media." The amount of separation needs to be only a few angstroms. There is another interparticle interaction, called magnetostatic interaction, which acts over a much greater distance between particles as compared to the exchange interaction. Reducing the magnetostatic interaction does reduce intrinsic media noise slightly. However, the effects of magnetostatic interaction actually improve hysteresis loop squareness and narrow the switching field distribution, and hence improve PW50 and OW Therefore, magnetostatic interaction is generally tolerated.

In order to obtain the best performance from the magnetic media, each of the above criteria—PW50, noise and OW—must be optimized. This is a formidable task, as each of these performance criteria are interrelated. For example, obtaining a narrower PW50 by increasing the Hc will adversely affect OW, since increasing Hc degrades OW. A thinner media having a lower remanant magnetization-thickness product ("MrT") yields a narrower PW50, however the read jitter increases because the media signal is reduced. Increasing squareness of the hysteresis loop contributes to narrower PW50, but generally increasing squareness increases noise. Thus, the amount that PW50 may be narrowed is limited by the increase in noise. Providing a mechanism for separating or isolating the grains to break the exchange coupling can effectively reduce the intrinsic media noise. Noise is improved by eliminating the interparticle exchange interaction. A slight further reduction of noise is possible by reducing magnetostatic interaction, but this reduces the hysteresis loop squareness and increases the switching field distribution, which degrades PW50 and OW.

In order to obtain the optimum media performance, the MrT must be reduced for better OW and PW50, but still retain sufficient signal to maintain acceptable read jitter. This is principally accomplished by reducing the film thickness (thereby reducing the space loss between the recording head pole tip and the media), and using an alloy having a higher saturation magnetization ("Ms").

Therefore, an optimal thin film magnetic recording media for high density recording applications, i.e., that can support high bit densities, requires low noise without sacrificing the switching field distribution, S*, and S*rem. Recording density can then be increased since bit jitter is reduced. In order to achieve the best compromise in performance, the individual grains of the magnetic film must be isolated to eliminate the exchange interaction, and grains must be uniform and have a tight distribution of sizes to minimize intrinsic media noise while maintaining high hysteresis squareness.

One type of magnetic media which has allowed optimizing certain of the above performance criteria is based on alloys of cobalt (Co) and platinum (Pt). CoPt is typically alloyed with nickel (Ni), chromium (Cr), etc. Attributes of CoPt alloys have been described by Murdock et al. in "Roadmap to 10 Gb/in$^2$ Media: Challenges", IEEE Trans. Mag., 1992, page 3078, by Opfer et al. in "Thin Film Memory Disk Development", Hewlett-Packard Journal (Nov. 1985), and by Aboaf et al., in "Magnetic Properties and Structure of Co—Pt Thin Film", IEEE Trans. Mag., page 1514 (1983), each incorporated herein by reference. Increasing storage capacity demands and performance requirements have motivated a search for ways to improve Co—Pt based alloys.

As stated above, a high Hc film will produce a narrow PW50, thus permitting an increase in storage density. One method of increasing Hc involves increasing the atomic percent ("at. %") of platinum in the film. This approach is described in Opfer et al., "Thin-Film Memory Disk Development" (referred to above). However, it is known that as the platinum content increases, SNR decreases due to a reduction in signal amplitude without a commensurate decrease in media noise.

In order to decrease the media noise, it is also known to introduce oxygen into the magnetic film in a concentration of 5 to 30 at. %, as taught by Howard et al. in U.S. Pat. No. 5,066,552, incorporated by reference herein. However, as pointed out by Howard et al. in said patent, introducing oxygen decreases both Hc and S$^*$.

Another approach to increasing Hc, as discussed by Maeda in "Effects of Nitrogen on the High Coercivity and Microstructures of Co—Ni Alloy Films," Journal of App. Phys., vol. 53, no. 10, pp. 6941–6945 (Oct. 1982), involves depositing a thin film magnetic media by sputtering in an ambient of argon and nitrogen. An increase in the nitrogen gas concentration in the chamber (e.g., about 24% by volume) is shown in this reference to be accompanied by an increase in Hc. However, magnetic films produced by this method exhibit a decrease in Ms. Also, the film produced by this method is not ferromagnetic as deposited. This method requires the additional step of annealing the deposited film at a relatively high temperature to diffuse large amounts of the nitrogen out of the cobalt film, thus rendering the film ferromagnetic.

Current and future demands of high-density magnetic media are foreclosing the opportunity for a trade off between Hc, Ms, SNR, etc. Therefore, there is at present a need in the art for a method of increasing the coercivity of a thin film magnetic alloy while yielding a high degree of squareness, high SNR, high overwrite, and low PW50.

SUMMARY OF THE INVENTION

The present invention is an improved CoPt based alloy doped with in excess of 1 atomic percent nitrogen in the film in order to increase the signal-to-noise ratio of the alloy, and a method for forming a magnetic recording media including this alloy. The alloy may be doped up to the limit at which coercivity falls below a preset target value and squareness falls to an undesirable level. A magnetic alloy is disclosed which has been doped with nitrogen and has a high coercivity, for example in the range of 1400 Oe or above, and simultaneously an increased SNR as compared to the same alloy which has not been doped with nitrogen. High squareness is also obtained as compared to the undoped alloy.

We believe that nitrogen is introduced such that intergrain spacing is minimized and grain growth is very uniform. The effects of nitrogen are greatly enhanced by employing a nucleation layer under the magnetic layer. The nucleation layer typically contains NiP, and may be doped for example with an oxide. One specific nucleation layer is comprised of $Ni_3P$ together with 1 wt. % of $Al_2O_3$. Importantly, the grain structure of the nucleation layer and nitrogen-containing magnetic alloy facilitate nitrogen separation in the interstices between the grains of the magnetic film, thereby reducing noise caused by exchange interaction between grains. Grain "clustering" is minimized, and uniform grain topology is achieved. We have found that the benefits of this effect increase with increasing amounts of nitrogen being introduced into the magnetic film. Therefore, we have developed a methodology for increasing the amount of nitrogen introduced into the magnetic film without sacrificing any parameters of the film, such as squareness, SNR, overwrite, and PW50.

In general, our research strongly suggests that low solubility elements may provide the exact benefits obtained by the introduction of nitrogen, namely the low noise provided by preferential segregation and destruction of intergranular exchange interaction. Therefore, in place of the nitrogen, other low solubility elements maybe employed, such as boron (B), phosphorous (P), sulfur (S), carbon (C), silicon (Si), arsenic (As), selenium (Se) and tellurium (Te).

The alloy of the present invention may also include additional elements such as tantalum (Ta), titanium (Ti), nickel (Ni), boron (B), chromium (Cr), etc. The concentrations of the additional elements of the alloy are chosen to maximize the magnetic and physical properties of the film as well as the incorporation of nitrogen. For example, $CoNi_{0.07}Pt_{0.12}Ta_{0.015}Ti_{0.015}B_{0.02}$ (meaning a film made from a target having this composition) doped with at least 1 at. % nitrogen in the film has provided a high degree of squareness while either maintaining or improving Hc, SNR (that is, by reducing media noise), OW, and PW50.

One method of forming the thin film magnetic alloy according to the present invention is sputtering in a nitrogen-rich ambient, so that the nitrogen is gettered in the sputtered film with the target elements. Another method is to form the thin film magnetic alloy by sputtering from a target which contains the alloy components doped with an appropriate amount of nitrogen.

BRIEF DESCRIPTION OF THE DRAWINGS

The present invention will be described in greater detail below, including specific examples thereof, with regard to the figures, in which.

As between each of these figures, like reference numerals shall denote like elements.

DETAILED DESCRIPTION

Figure 1:
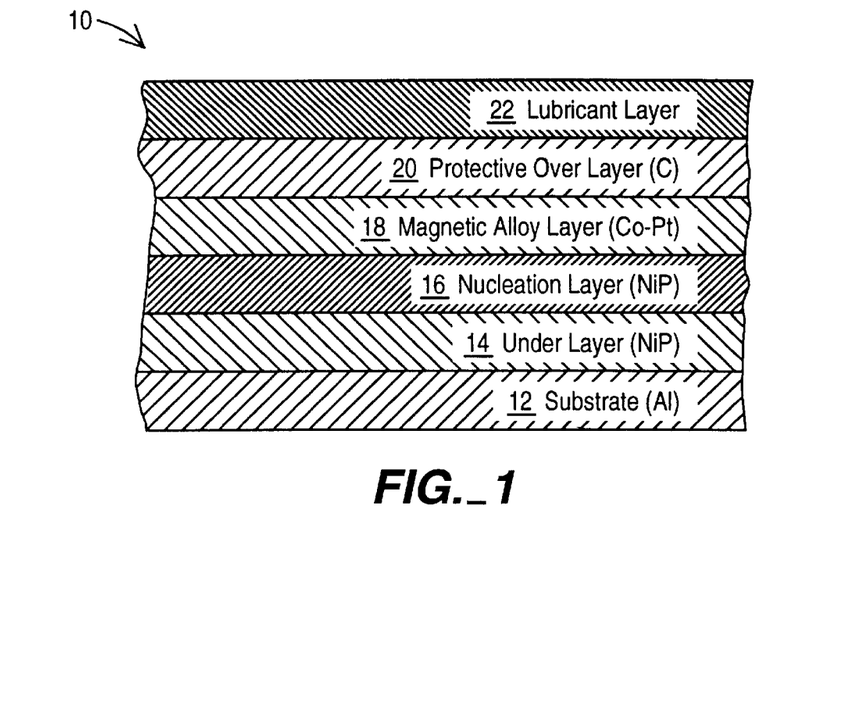
FIG. 1 is a cross section of a rigid thin-film magnetic disk constructed in accordance with the present invention.

FIG. 1 is a cross section of a rigid thin-film magnetic disk 10 constructed in accordance with the present invention. Disk 10 consists of an aluminum alloy substrate 12 onto which a plated layer 14, typically of NiP, is formed by electroless plating or other methods well known in the art. Layer 14 typically has a thickness in the range of 5 to 20 $\mu$m. The plated layer 14 of NiP provides strong mechanical support on the relatively soft aluminum substrate 12. After layer 14 is plated onto substrate 12, the disk is polished, textured, and cleaned. Although the embodiment described in detail herein employs an aluminum substrate, media based on other substrate materials such as glass, Memcor (a Trademark for a Corning proprietary glass ceramic material), carbon-based materials, silicon, titanium, stainless steel, etc., are equally within the contemplation of the present invention.

A sputtered nucleation layer 16 is then deposited onto layer 14. Sputtering of nucleation layer 16 may be accomplished as described in U.S. Pat. No. 4,786,564, issued to Chen et al., which is incorporated herein by reference, although other methods such as ion plating and evaporation are known and available. An example of the sputtering conditions for layer 16 include a pressure of 5 to 40 mTorr and a power density between 2 and 3 watts/cm$^2$. Typically, sputtered nucleation layer 16 is in the range of 30 to 100 nm thick.

In general, nucleation layer 16 includes NiP, and may also include selected dopants, such as oxides $Al_2O_3$, $TiO_2$, $Ta_2O_5$, $HfO_2$, $ZrO_2$, etc. In one embodiment, the sputtered nucleation layer 16 consists of NiP with P at about 15 wt. % together with 1 wt. % $Al_2O_3$ (although $Al_2O_3$ may be incorporated up to 5 wt. %). It should be noted that proper selection of the nucleation layer constituents and concentrations is very important in obtaining the optimum effects of the introduction of nitrogen. It is our understanding that the nucleation layer provides the subsequent magnetic layer with the necessary grain structure to facilitate the segregation of the additive elements to thereby destroy the intergranular exchange coupling for reduced noise and improved magnetic performance. However, materials other than NiP and an oxide may also provide this result.

A magnetic alloy layer 18 is then deposited on nucleation layer 16. In general, layer 18 is an alloy including Co and Pt. In one embodiment, the alloy further includes Ni. In this embodiment, the platinum concentration is between about 5 and 20 at. %, the nickel concentration is between 0 and about 10 at. %, and the cobalt concentration is greater than about 75 at. %.

In another embodiment of our invention, the magnetic layer 18 further includes the additional alloying elements Ta and/or Ti in a concentration of about 10 at. % or less. Each of these element improve the magnetic layer's ability to accommodate increased amounts of nitrogen, as well as other attributes of the magnetic layer.

Cr may also be introduced, for example in a concentration up to about 3 at. %. The addition of Cr provides corrosion resistance, but may result in some degree of reduction of Ms.

Additionally, boron, B, may be added to the magnetic alloy layer 18, for example to further reduce the media noise. The concentration of B in the magnetic layer may vary up to about 6 at. %. Results of our research show that a smaller amount of B, generally 3 at. % or lower, is sufficient to reduce media noise and thus improve the signal-to-noise ratio of our selected alloy without seriously degrading the Ms of the recording medium.

In general, the sum of the Ta, Ti, Cr, and/or B should not exceed about 20 at. % of the total alloy so as to maintain high Ms. However, the exact amounts of the various constituents may be adjusted, above or below the cited ranges, in order to optimize one or more aspects of the resulting media. Also, although the addition of Ni, Ta, Ti, Cr, and B have been discussed herein, this description should not be read to exclude the addition of other elements, as appropriate.

Finally, a protective over layer 20 of a type known in the art, e.g., of hydrogenated carbon, or oxides such as $ZrO_2$, $SiO_2$, etc., or nitrides such as TiN, ZrN, etc., and a lubricant layer 22 of a type known in the art, e.g., a solid or liquid lubricant, are applied over magnetic layer 18. Details of the protective over layer 20 and lubricant layer 22 are beyond the scope of the present invention, and therefore are not discussed in detail herein.

Specifically, one embodiment of magnetic alloy layer 18 was RF diode sputtered $CoNi_{0.07}Pt_{0.12}Ti_{0.015}Ta_{0.015}B_{0.02}$ (where the subscripts represent the atomic percent, for example 7 at. % Ni, and where the missing subscript denotes the balance of the alloy). The magnetic alloy sputter chamber was evacuated, then populated with a mixture of argon and nitrogen. Tests were conducted on the effect of introducing varying levels of nitrogen by varying the concentration of nitrogen in the argon-nitrogen gas mixture. The pressure in the sputter chamber was about 15 to 35 mTorr. The sputter power density was about 1.5 to 3 watts/cm$^2$.

Figure 2:
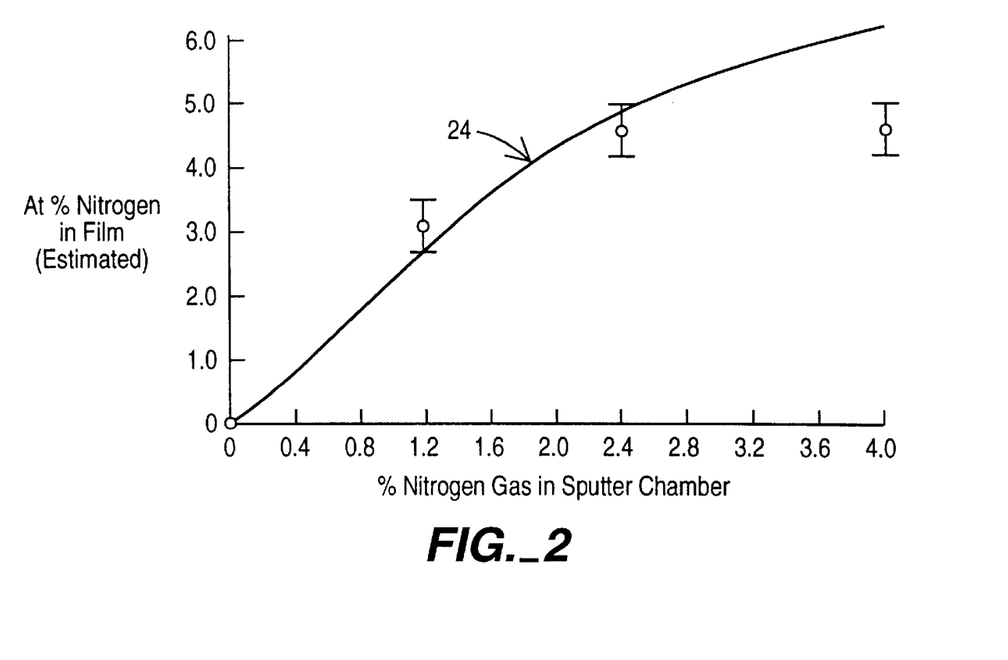
FIG. 2 is a plot of the amount of nitrogen incorporated into a magnetic layer as a function of the percent by volume of nitrogen in the gas.

Samples from $CoNi_{0.07}Pt_{0.14}Ti_{0.015}Ta_{0.015}B_{0.02}$ alloys sputtered at various gas concentrations (in percent of volume, "vol. %") were analyzed for nitrogen 1s and cobalt $2p_{3/2}$ peaks using Electron Spectroscopy for Chemical Analysis (ESCA) technique to determine the amount of nitrogen incorporated into magnetic layer 18 as a function of the percent by volume of nitrogen in the gas. The at. % of nitrogen in each magnetic film was determined as a ratio of cobalt, yielding Table 1 and FIG. 2. Our present belief is that the incorporation of nitrogen into the film increases proportionally with an increase in the concentration of the nitrogen in the sputtering gas. Therefore, we have estimated the incorporation curve as shown at 24 of FIG. 2.

TABLE 1

| Gas Composition | N:Co atomic ratio | Nitrogen in Film |
| --- | --- | --- |
| 0 vol. % | no nitrogen detected (detection limit ~1 at. %) | 0 |
| 1.2 vol. % | 0.04 ± .01 | 3.04 ± .76 at. % |
| 2.4 vol. % | 0.06 ± .01 | 4.56 ± .76 at. % |
| 4 vol. % | 0.06 ± .01 | 4.56 ± .76 at. % |

From the binding energy of the nitrogen peak, it appears that the nitrogen incorporated into the magnetic film is in the form of a nitride.

Figure 3:
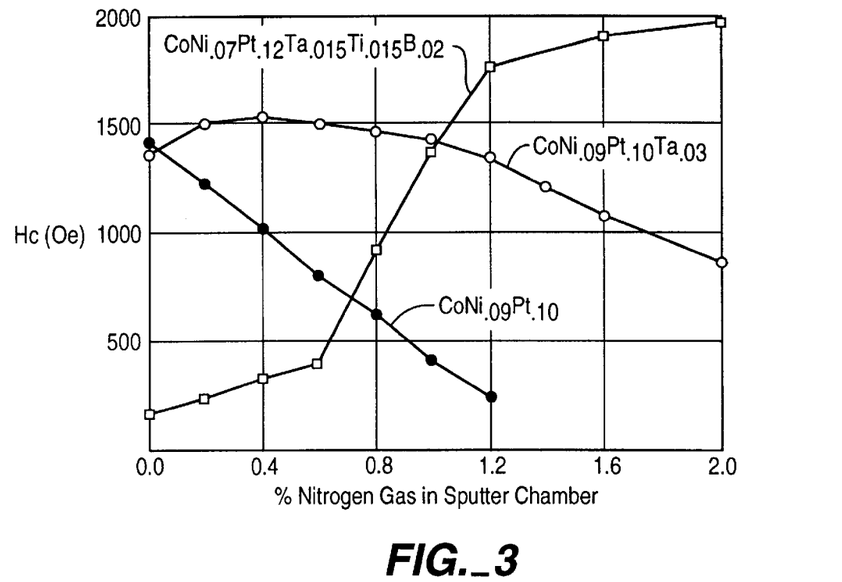
FIG. 3 is a plot showing the effect an increase in the amount of nitrogen has on the Hc of various magnetic thin films.

FIG. 3 is a plot showing the effect an increase in the amount of nitrogen has on the Hc of various films. It is seen from FIG. 3 that for the prior art alloy $CoNi_{0.09}Pt_{0.10}$ the addition of nitrogen into the film results in a rapid decrease in Hc. This means that in order to incorporate nitrogen into this film, and take advantage of the benefits of adding relatively high amounts of nitrogen, the coercivity of this film must be increased, for example by increasing the atomic percent of Pt in the film. That is, the composition of the alloy may be adjusted to obtain a desired noise performance at the desired coercivity.

However, the plot of Hc versus percent of nitrogen in the gas for the alloy $CoNi_{0.09}Pt_{0.10}Ta_{0.03}$ shown in FIG. 3 illustrates that the Hc of this alloy decreases at a much slower rate than that for the $CoNi_{0.09}Pt_{0.10}$ as nitrogen increases. In fact, we have found that Hc increases somewhat with a nitrogen concentration in the range of 0.3–0.6 vol. %.

The plot of Hc versus percent of nitrogen for the alloy $CoNi_{0.07}Pt_{0.12}Ta_{0.015}Ti_{0.015}B_{0.02}$ shown in FIG. 3 illustrates that Hc increases drastically with a nitrogen concentration in the range of 0.5–1.2 vol. %, and further addition of nitrogen (i.e., over 2 vol. %) eventually leads to a decrease in Hc. However, the Hc decreases for $CoNi_{0.07}Pt_{0.12}Ta_{0.015}Ti_{0.015}B_{0.02}$ is even slower than the rate of decrease for $CoNi_{0.09}Pt_{0.10}Ta_{0.03}$.

Table 2 illustrates the effect of the introduction of nitrogen on the squareness of the films. The $CoNi_{0.09}Pt_{0.10}$ and $CoNi_{0.09}Pt_{0.10}Ta_{0.03}$ films were sputtered under identical conditions in the presence of 1 vol. % nitrogen in argon. The $CoNi_{0.07}Pt_{0.12}Ta_{0.015}Ti_{0.015}B_{0.02}$ film was sputtered under the same conditions as the other two films, with the exception that the gas concentration was 2 vol. % nitrogen. Specifically, at 1 vol. % for $CoNi_{0.09}Pt_{0.10}$ each of the performance parameters Hc, S, S*rem, and S* were unacceptable. At 1 vol. % for $CoNi_{0.09}Pt_{0.10}Ta_{0.03}$ squareness improved significantly, and coercivity remained high. However, the $CoNi_{0.07}Pt_{0.12}Ta_{0.015}Ti_{0.015}B_{0.02}$ film exhibited superior squareness while maintaining a very high Hc. Importantly, this result was achieved at the high concentration of 2% vol. of nitrogen.

TABLE 2

| Alloy | Nitrogen | Hc | S | S*rem | S* |
|---|---|---|---|---|---|
| $CoNi_{.07}Pt_{.12}Ti_{.015}Ta_{.015}B_{.02}$ | 2 vol. % | 1977 | 0.85 | 0.924 | 0.9 |
| $CoNi_{.09}Pt_{.10}Ta_{.03}$ | 1 vol. % | 1489 | 0.798 | 0.924 | 0.884 |
| $CoNi_{.09}Pt_{.10}$ | 1 vol. % | 360 | 0.74 | 0.84 | 0.765 |

Figure 4:
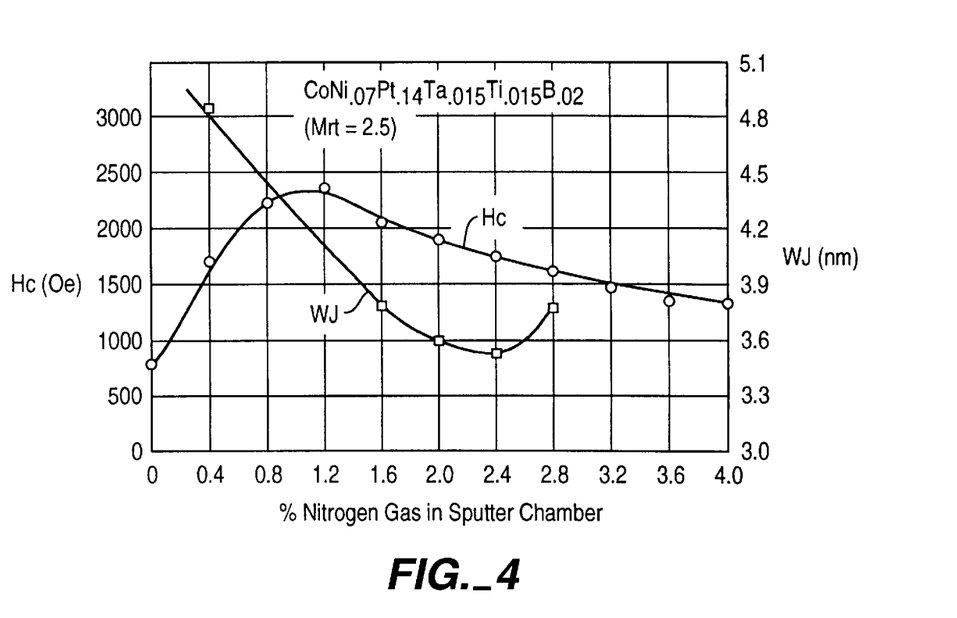
FIG. 4 is a plot of the coercivity and the write jitter against vol. % of nitrogen in sputter gas for a $CoNi_{0.07}Pt_{0.14}Ta_{0.015}Ti_{0.015}B_{0.02}+N_2$ magnetic film having an Mrt of 2.5 memu/cm$^2$ according to the present invention.

Referring now to FIG. 4, a plot of the coercivity and the write jitter ("WJ") of a magnetic film according to the present invention is shown. Note that WJ measures the uncertainty in the detected location of each transition, since the magnetization noise resides primarily in the transitions. The uncertainty is just the standard deviation of the detected transitions about the mean position. A high write jitter indicates a low SNR, and vice-versa. Details of jitter measurement has been discussed in H. P. Application Note # 358-3, entitled, "Time Domain Characterization of Disk Drives."

The film of FIG. 4 comprises $CoNi_{0.7}Pt_{0.14}Ta_{0.15}Ti_{0.015}B_{0.02}$ having an Mrt of 2.5 memu/$cm^2$, deposited with different concentrations of nitrogen. The WJ of these films were measured using a thin film inductive head of p1/g/p2 of 3.2/0.3/3.2 $\mu m$, track width of 6.0 um, 42 turns and the flying height was 0.063 $\mu m$ at a linear velocity of 12.5 m/sec, at a recording frequency of 12.9 MHz, on a Guzik-501 (Guzik Corp., Santa Clara, Calif.). The film of FIG. 4 exhibits a peak Hc at about 2300 Oe with about 1.2 vol. %. Furthermore, the film of FIG. 4 exhibits a very slow decrease of Hc with increasing nitrogen gas (i.e., more nitrogen in the film for a given Hc), as well as a wide range of nitrogen concentrations corresponding to an Hc above about 1500 Oe. Importantly, WJ was quite low for films with high coercivity. Specifically, WJ was between 3.50–3.75 nm at coercivities between about 1500–2000 Oe. Furthermore, WJ was at a minimum of 3.50 nm and coercivity at about 1700 Oe with a nitrogen content of about 2.4 vol. %. This demonstrates a critical advantage of the present invention, namely allowing the incorporation of nitrogen into the magnetic film to decrease media noise and hence increase SNR while maintaining a high Hc.

Figure 5:
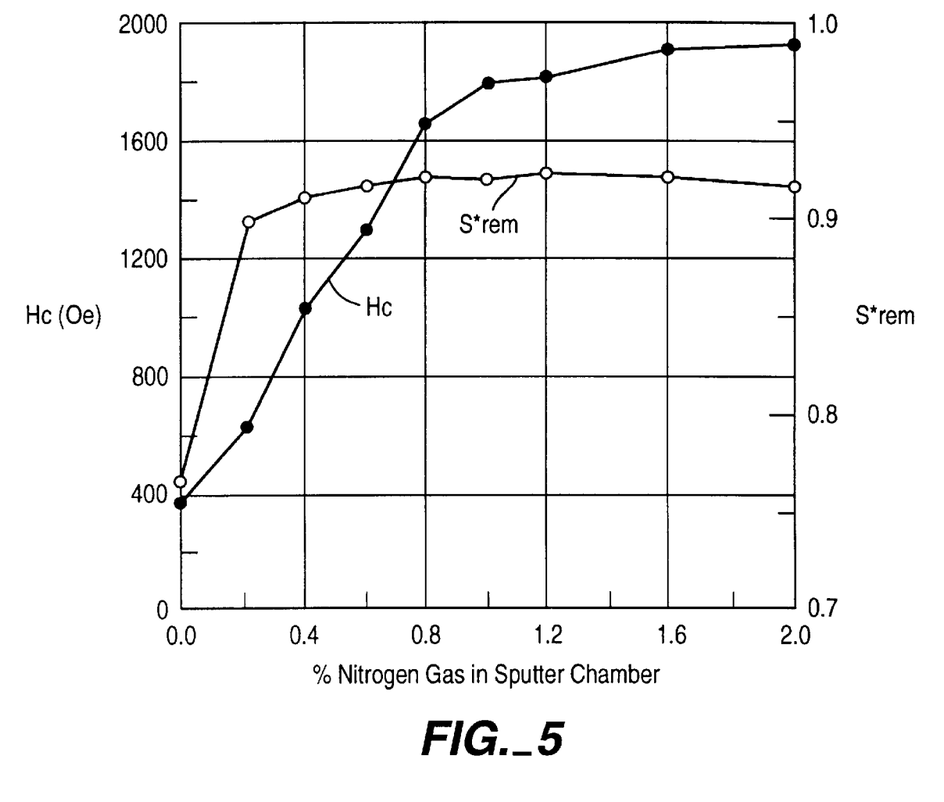
FIG. 5 is an illustration of the remanant squareness as a function of varying nitrogen concentrations for a $CoNi_{0.07}Pt_{0.12}Ta_{0.015}Ti_{0.015}B_{0.02}+N_2$ magnetic film having an Mrt of 2.5 according to the present invention.

We have also measured the remanant squareness as a function of varying nitrogen concentrations for a $CoNi_{0.07}Pt_{0.12}Ta_{0.015}Ti_{0.015}B_{0.02}$ magnetic film having an Mrt of 2.5 memu/cm2, and have illustrated the results in FIG. 5. This film was sputtered at approximately 20 mTorr, and the resulting magnetic layer was 450 Å thick. The results illustrated in FIG. 5 are striking in that both the squareness and coercivity increased as the nitrogen concentration increased. In particular, around 2.0 vol. % nitrogen, the squareness of the film of FIG. 5 was at a maximum. Thus, the increased nitrogen content of the film provides low noise, high Hc and high squareness.

It is our belief that the advantages provided by the present invention are based in the formation of a nitride at the grain boundary of the magnetic alloy. The nitride decreases intergranular exchange interactions, thereby minimizing intrinsic media noise. The effects of this isolation are greatly enhanced by the introduction of relatively large amounts of nitrogen. According to Yamashita et al., U.S. Pat. No. 4,749,459, above 1 at. % nitrogen in the film, the Hc is reduced to unacceptably low levels, rendering the alloy useless. Any effect of high concentrations of nitrogen (e.g., above around 1 at. %) on noise performance were not expected. Maeda, in "Effects of Nitrogen on the High Coercivity and Microstructures of Co—Ni Alloy Films," cited above, adds more than 20 at. % nitrogen, rendering the alloy non-ferromagnetic. Therefore, we have discovered that certain alloying elements, when added to a Co—Pt based magnetic alloy, greatly enhance the effects of incorporation of relatively large amounts of nitrogen by maintaining high Hc, allowing noise to be reduced significantly, and maintaining high squareness.

Figure 6A:
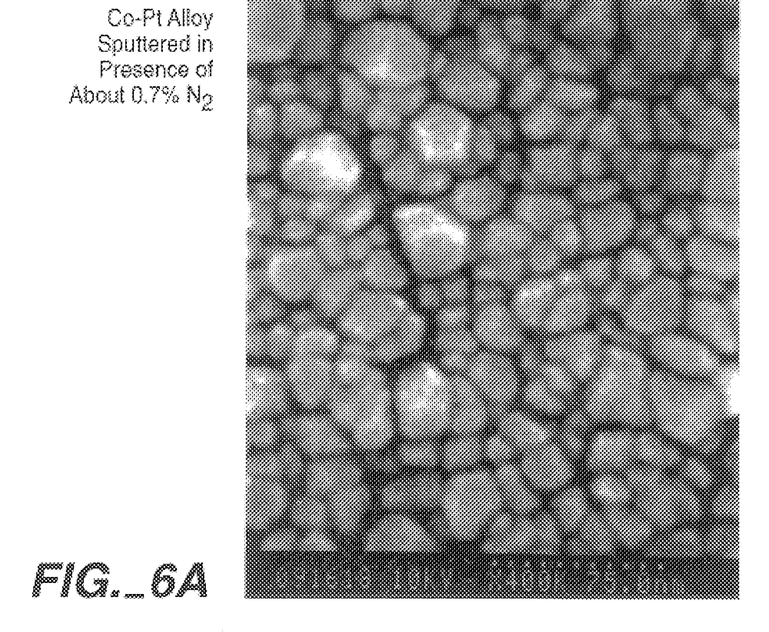
FIG. 6(a) is a microphotograph of a CoPt alloy sputtered in the presence of 0.7 vol. % of $O_2$ in the gas.
Figure 6B:
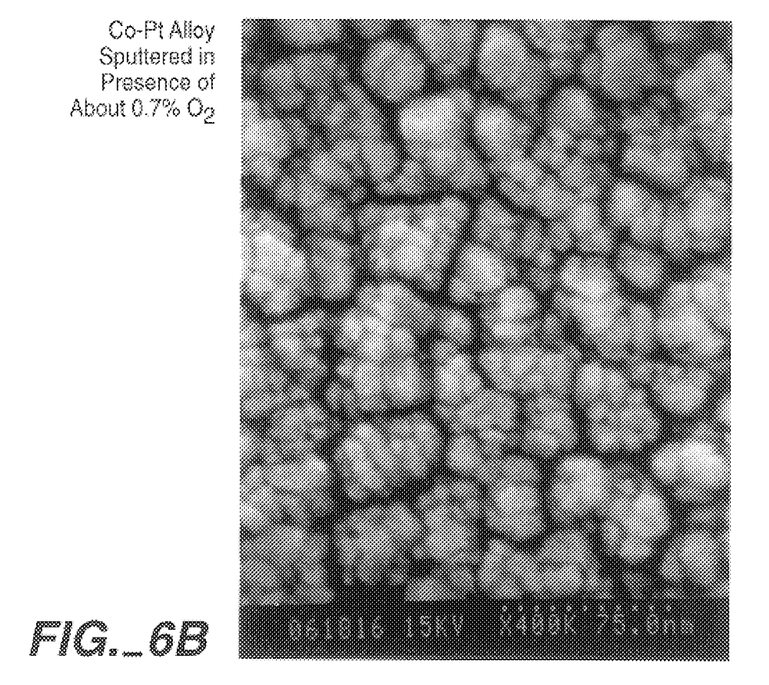
FIG. 6(b) is a microphotograph of a CoPt alloy sputtered in the presence of 0.7 vol. % of $N_2$.

We have compared the effects of nitrogen and oxygen on the magnetic properties and microstructures of films. FIG. 6(a) shows a high resolution microphotograph of the magnetic grains of a Co—Pt alloy, sputtered in the presence of about 0.7 vol. % $O_2$ in the sputtering gas. FIG. 6(b) also shows a high resolution microphotograph of the magnetic grains of a Co—Pt alloy, however this alloy was sputtered in the presence of about 0.7 vol. % $N_2$ in the sputtering gas. The high resolution microphotographs were obtained using a Hitachi S900 Scanning Electron Microscope operating at about 30 kV.

Comparing FIGS. 6(a) and 6(b), it can be seen that the grains shown in FIG. 6(a) are somewhat smaller than those of FIG. 6(b). Also, a number of the grains of the alloy shown in FIG. 6(a) have combined together to form "clusters.". The size of the "clusters" vary significantly, as does the separation between the "clusters". Such non-uniform grain structure results in a broad switching-field distribution. The net effect is that although Hc increases, the squareness drops drastically, as shown by Howard et al. in U.S. Pat. No. 5,066,552, which is incorporated herein by reference. The alloy shown in FIG. 6(b) shows single grains which have a very uniform intergranular isolation. Such uniform grain structure provide narrower switching-field distribution, increased Hc and squareness, as shown in Table no. 2. Thus, we conclude that the introduction of nitrogen provides superior magnetic properties, based at least in part on the uniform grain structure and intergranular isolation, as compared with the introduction of oxygen.

It is our understanding that low solubility in the cobalt-platinum alloy is the reason nitrogen results in a very low media noise without seriously affecting the other recording performance parameters. Low solubility would cause preferential segregation of the additive nonmagnetic element to the intergranular regions. As mentioned earlier this would destroy the intergranular exchange coupling and thereby enhance the SNR. Furthermore, only a small percentage of such low solubility elements need to be added to be effective in destroying the intergranular exchange interaction, whereby only a minimal amount of the additive element stays within the grain body thus maintaining relatively higher Ms.

In general, our research strongly suggests that low solubility elements may provide the exact benefits obtained by the introduction of nitrogen, namely the low noise provided by preferential segregation and destruction intergranular exchange interaction. For example, the earlier-mentioned results relating to boron indicate that as little as 2 to 3 at. % of boron is sufficient to provide a significant improvement in the SNR. Since the elements of group IIIB to VB of the periodic table have low solubility in cobalt, they would also be effective additive elements to enhance SNR of CoPt alloys. Specific examples of such elements include: B, P, S, C, Si, As, Se and Te, as evident from the phase diagrams shown in, "Binary Alloy Phase Diagrams", vols. I & II, Ed. T. B. Massalski, American Society of Metals (Ohio, 1986). We conclude that there are a number of CoPt alloy systems in which such low solubility elements may be incorporated to provide a low noise media. Such systems include those having a relatively high content of Pt (for example a Pt content of 10 at. % or greater), which are devoid of Cr, and which may include Ni. Introduction of the additive elements into the alloy system may be from a gas, solid or liquid, and may be by sputtering, plating, or other method as appropriate. Such systems are therefore within the broad contemplation of the present invention.

While the invention has been described above with respect to the specific embodiments, those skilled in the art will appreciate that modifications may be made without departing from the spirit and scope of the invention. For example, the primary mechanism for the introduction of the nitrogen has been by introducing nitrogen together with the inert sputtering gas. The sputtering elements getter the nitrogen during the formation of the magnetic layer. However, the nitrogen may be introduced in the form of other gases such as $NH_3$, $N_2O$, NO, etc. Likewise, the sputter target may be doped with an appropriate concentration of nitrogen such that the nitrogen is sputter deposited together with the other elements comprising the magnetic layer. Alternatively, the nitrogen may be co-sputtered from a separate target containing a nitride, etc., and therefore these and other variations on the introduction of nitrogen are within the scope of the present invention.

What is claimed is:

1. A magnetic recording media for horizontal recording, comprising:
    a substrate; and
    a sputter deposited magnetic layer, which exhibits ferromagnetism as deposited and which is not heat treated after deposition, formed over said substrate, the magnetic layer having a composition comprising an alloy of cobalt and platinum, said magnetic layer doped with nitrogen in an amount greater than approximately 1 atomic percent, the sputtered magnetic layer doped with nitrogen exhibiting a higher signal-to-noise ratio than the sputtered magnetic layer without nitrogen.

2. The magnetic recording media of claim 1, wherein said magnetic layer is doped with an amount of nitrogen such that the magnetic layer as doped has a saturation magnetization of at least 90 percent of that of the undoped cobalt-platinum alloy, and a remanant coercivity squareness of at least 0.80 percent.

3. A magnetic recording media for horizontal recording, comprising:
    a substrate;
    a nucleation layer sputter deposited on said substrate; and
    a sputter deposited magnetic layer, which exhibits ferromagnetism as deposited and which is not heat treated after deposition, formed over said substrate, the magnetic layer having a composition comprising an alloy of cobalt and platinum, said magnetic layer doped with nitrogen in an amount greater than approximately 1 atomic percent, the sputtered magnetic layer doped with nitrogen exhibiting a higher signal-to-noise ratio than the sputtered magnetic layer without nitrogen.

4. The magnetic recording media of claim 3, wherein said magnetic layer is doped with an amount of nitrogen such that the magnetic layer as doped has a saturation magnetization of at least 90 percent of that of the undoped cobalt-platinum alloy, and a remanant coercivity squareness of at least 0.80 percent.

5. The magnetic recording media of claim 3, the magnetic layer further comprising at least one additional element selected from the group consisting of Ta, Ti, Cr, and B.

6. The magnetic recording media of claim 3, wherein the coercivity of the magnetic layer as deposited is at least 1400 Oe.

7. The magnetic recording media of claim 3, wherein said magnetic layer further includes oxygen.

8. The magnetic recording media of claim 3, wherein said nucleation layer comprises $Ni_{1-a-b}P_aX_b$, where $0<a \leq 0.15$ wt. %. $0<b \leq 0.05$ wt. %. and where X is an oxide of at least one element selected from the group comprising Al, Ti, Ta, Zr, and Hf.

9. A magnetic recording media for horizontal recording, comprising:
    a substrate;
    a nucleation layer sputter deposited on said substrate; and
    a sputter deposited magnetic layer, which exhibits ferromagnetism as deposited, formed over said substrate, the magnetic layer having a composition comprising cobalt, platinum, and nickel, said magnetic layer further being doped with at least one element selected from the group comprising B, P, S, C, Si, As, Se and Te;
    the magnetic recording media having an as-deposited coercivity of at least 1400 Oe.

10. The magnetic recording media of claim 9, wherein said magnetic layer includes platinum in a concentration of at least 10 atomic percent.

11. The magnetic recording media of claim 1 wherein said magnetic layer further comprises at least one material selected from the group consisting of tantalum and titanium.

12. The magnetic recording media of claim 11 wherein said at least one additional material comprises less than or equal to 10 atomic percent of said magnetic layer.

13. The magnetic recording media of claim 11 wherein said magnetic layer further comprises boron.

14. The magnetic recording media of claim 13 wherein said magnetic layer further comprises chromium.

15. The magnetic recording media of claim 13 wherein said boron comprises less than or equal to 3 atomic percent and said chromium comprises less than or equal to 6 atomic percent of said magnetic layer.

16. The magnetic recording media of claim 15 wherein the combined atomic percentage of tantalum, titanium, chromium and boron is less than or equal to 20 atomic percent.

17. A magnetic recording media comprising:
a substrate; and
a vacuum deposited magnetic layer formed over said substrate said magnetic layer having a composition comprising an alloy of cobalt and platinum, said magnetic layer doped with at least one material selected from the group consisting of phosphorus, sulfur, carbon, selenium, and tellurium in an amount greater than approximately 1 atomic percent, the magnetic layer doped with said material exhibiting a higher signal to noise ratio than the magnetic layer without said material.

18. The magnetic recording media as described in claim 17 wherein said magnetic layer is doped with an amount of said material such that said magnetic layer as doped has a saturation magnetization of at least 90 percent of that of undoped alloy of cobalt and platinum, and a remanant coercivity squareness of at least 0.8.

19. The magnetic recording media of claim 17 further comprising at least one additional material selected from the group consisting of tantalum and titanium.

* * * * *